(12) United States Patent
Seo (10) Patent No.: US 10,138,760 B2
(45) Date of Patent: Nov. 27, 2018

(54) WORKING FLUID COLLECTING APPARATUS FOR RANKINE CYCLE WASTE HEAT RECOVERY SYSTEM

(71) Applicant: HYUNDAI MOTOR COMPANY, Seoul (KR)

(72) Inventor: Jung Min Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 226 days.

(21) Appl. No.: 15/177,130

(22) Filed: Jun. 8, 2016

(65) Prior Publication Data
US 2017/0016352 A1 Jan. 19, 2017

(30) Foreign Application Priority Data
Jul. 13, 2015 (KR) .................... 10-2015-0099300

(51) Int. Cl.
*F01K 11/00* (2006.01)
*F01K 13/02* (2006.01)
*F01K 23/06* (2006.01)
*F02G 5/02* (2006.01)

(52) U.S. Cl.
CPC ............. *F01K 13/02* (2013.01); *F01K 11/00* (2013.01); *F01K 23/065* (2013.01); *F02G 5/02* (2013.01); *Y02A 30/274* (2018.01); *Y02T 10/166* (2013.01)

(58) Field of Classification Search
CPC . F01K 11/00; F01K 13/02; F02G 5/02; Y02T 10/166
See application file for complete search history.

(56) References Cited

U.S. PATENT DOCUMENTS

| 8,919,123 | B2 * | 12/2014 | Gibble | ...................... F01K 7/40 60/320 |
|---|---|---|---|---|
| 2006/0236698 | A1 * | 10/2006 | Langson | ................. F01K 25/08 60/651 |
| 2011/0308253 | A1 * | 12/2011 | Ritter | ...................... F01K 23/04 60/661 |
| 2012/0192560 | A1 * | 8/2012 | Ernst | ..................... F01K 23/065 60/616 |
| 2013/0199178 | A1 * | 8/2013 | Kanou | ...................... F01K 7/22 60/605.2 |
| 2014/0311141 | A1 * | 10/2014 | Mori | ......................... F02G 5/00 60/599 |
| 2016/0252310 | A1 * | 9/2016 | Butzke | .................... F28F 13/06 165/100 |
| 2017/0016356 | A1 * | 1/2017 | Seo | ........................ F01K 23/101 |

FOREIGN PATENT DOCUMENTS

| JP | 2011-069327 A | | 4/2011 |
|---|---|---|---|
| JP | 2011069327 A | * | 4/2011 |
| JP | 2011-149386 A | | 8/2011 |
| JP | 2012-007500 A | | 1/2012 |
| JP | 2012-077630 A | | 4/2012 |

(Continued)

*Primary Examiner* — Putthiwat Wongwian
*Assistant Examiner* — Matthew T Largi
(74) *Attorney, Agent, or Firm* — McDermott Will & Emery LLP (57) ABSTRACT

A working fluid collecting apparatus for a Rankine cycle waste heat recovery system includes a storage tank for storing a working fluid circulated in a Rankine cycle therein, and a collection means for collecting the working fluid into the storage tank.

19 Claims, 7 Drawing Sheets

(56) References Cited

FOREIGN PATENT DOCUMENTS

| | | | |
|---|---|---|---|
| JP | 2012-102644 A | | 5/2012 |
| JP | 2012-102645 A | | 5/2012 |
| JP | 2013-076397 A | | 4/2013 |
| JP | 2013-181394 A | | 9/2013 |
| JP | 2014-190276 A | | 10/2014 |
| JP | 2014-190277 A | | 10/2014 |
| JP | 2014190276 A | * | 10/2014 |
| KR | 10-2014-0055074 A | | 5/2014 |

* cited by examiner

WORKING FLUID COLLECTING APPARATUS FOR RANKINE CYCLE WASTE HEAT RECOVERY SYSTEM

CROSS-REFERENCE TO RELATED APPLICATION

This application claims the benefit of priority to Korean Patent Application No. 10-2015-0099300, filed on Jul. 13, 2015 with the Korean Intellectual Property Office, the disclosure of which is incorporated herein in its entirety by reference.

TECHNICAL FIELD

The present disclosure relates to a Rankine cycle waste heat recovery system of recovering waste heat of an internal combustion engine as energy using a Rankine cycle, and more particularly, to a working fluid collecting apparatus for a Rankine cycle waste heat recovery system capable of preventing leakage, freezing, or the like, of a working fluid by collecting the working fluid in the Rankine cycle waste heat recovery system into a storage tank at the time of a stop of an operation of the Rankine cycle waste heat recovery system and/or occurrence of a problematic phenomenon.

BACKGROUND

Engines have been widely used in vehicles, ships, small power generators, and the like, and attempts to improve an efficiency of the engine are continuously conducted. In an engine, a large quantity of heat is generally discharged as waste heat, and a waste heat recovery system for increasing entire efficiency of the engine by recovering the waste heat as energy has been developed.

The waste heat recovery system is configured to recover the waste heat of the engine as energy, convert the recovered energy into electric energy or mechanical energy, and utilize the electric energy or the mechanical energy in the engine, other electrical accessories, or the like, of the vehicle.

As a typical implementation technology of the waste heat recovery system, a Rankine cycle waste heat recovery system of recovering the waste heat of the engine as energy is employed in conjunction with a Rankine cycle engine. The Rankine cycle includes a circulation path through which a working fluid is circulated, and the circulation path of the Rankine cycle is provided with a boiler for heating and evaporating the working fluid by the waste heat (heat of an exhaust gas and/or heat of an exhaust gas recirculation (EGR) gas) of the engine, an expander for expanding the working fluid supplied from the boiler to generate rotational power, a condenser for condensing the working fluid discharged from the expander, and a pump for circulating the working fluid on the circulation path.

Meanwhile, water, ethanol, refrigerant, or the like, has been used as the working fluid of the Rankine cycle engine. In the case in which the working fluid is leaked, various risks may result, and in the case in which the working fluid remains in the circulation path or a main component, damage to the main components may occur due to freezing, or the like.

For example, since water has a volume that expands when frozen at a temperature of 0 degrees or less, in the case in which the water is frozen in a main component such as a heat exchanger, the main component may be damaged, and when ethanol is leaked, there a risk that fire may result. When the refrigerant is leaked, various problems may occur due to toxicity, a high global warming potential (GWP), and the like, of the refrigerant.

SUMMARY

The present disclosure has been made to solve the above-mentioned problems occurring in the prior art while advantages achieved by the prior art are maintained intact.

An aspect of the present disclosure provides a working fluid collecting apparatus for a Rankine cycle waste heat recovery system capable of preventing a working fluid of a Rankine cycle from being leaked, effectively monitoring whether or not the working fluid is leaked, and effectively preventing freezing, or the like, of the working fluid due to remaining of the working fluid.

According to an exemplary embodiment of the present disclosure, a working fluid collecting apparatus for a Rankine cycle waste heat recovery system includes: a storage tank configured to store a working fluid circulated in a Rankine cycle therein; and a collection means configured to collect the working fluid into the storage tank.

The collection means may include: a directional control valve configured to control a flow direction of the working fluid in the Rankine cycle; and a collection line configured to introduce the working fluid into the storage tank by a control of the directional control valve.

The directional control valve may include one or more collection ports allowing the working fluid to flow to the storage tank, and the collection line may be connected from the collection port of the directional control valve to the storage tank.

The directional control valve may include a first collection port and a second collection port, and the collection line may include a first collection line connected to the first collection port and a second collection line connected to the second collection port.

The first collection port and the second collection port may be sequentially opened, such that the working fluid is stepwise collected into the storage tank through the first collection line and the second collection line.

According to another exemplary embodiment of the present disclosure, a working fluid collecting apparatus for a Rankine cycle waste heat recovery system including a circulation path through which a working fluid is circulated, and a boiler heating and evaporating the working fluid by waste heat of an engine, an expander expanding the working fluid supplied from the boiler to generate rotational power, a condenser condensing the working fluid discharged from the expander, and a circulation pump circulating the working fluid on the circulation path, includes: a storage tank installed between the condenser and the circulation pump and configured to store the working fluid therein; a directional control valve installed between the circulation pump and the boiler, configured to control a flow direction of the working fluid, and having one or more collection ports allowing the working fluid to flow to the storage tank; and one or more collection lines connected from the collection ports of the directional control valve to the storage tank.

The directional control valve may include an inlet port connected to the storage tank, an outlet port connected to the boiler, and first and second collection ports that are opened and closed so that the working fluid flows from an evaporator toward the storage tank.

The collection lines may include a first collection line connected from the first collection port to the storage tank and a second collection line connected from the second collection port to the storage tank.

A collection pump for forcibly transferring the working fluid toward the storage tank may be installed on the second collection line.

The first collection line and the second collection line may be connected at a point upstream of the storage tank on the circulation path.

A junction in which the first collection line and the second collection line are connected at may be positioned between the expander and the condenser.

A backward flow preventing valve preventing the working fluid from flowing backward from the condenser to the expander may be installed between the expander and the condenser.

The directional control valve may have a first position at which the inlet port and the outlet port are in communication with each other, a second position at which the outlet port and the first collection port are in communication with each other, and a third position at which the outlet port and the second collection port are in communication with each other.

The storage tank may be positioned below the condenser.

The directional control valve and a collection pump may be positioned below the storage tank.

The boiler may include an exhaust gas boiler arranged in an exhaust pipe of the engine and an exhaust gas recirculation (EGR) gas boiler arranged in an EGR path of the engine.

The exhaust gas boiler and the EGR gas boiler may be connected to each other in series with respect to the circulation path.

The exhaust gas boiler and the EGR gas boiler may be connected to each other in parallel with respect to the circulation path.

A channel switching valve switching a channel so that the working fluid flows toward at least one of the exhaust gas boiler and the EGR gas boiler may be connected to the directional control valve.

According to still another exemplary embodiment of the present disclosure, a working fluid collecting method for a Rankine cycle waste heat recovery system using a working fluid collecting apparatus for a Rankine cycle waste heat recovery system including a storage tank configured to store a working fluid circulated through a circulation path in which a boiler, an expander, a condenser, and a circulation pump are installed therein, a directional control valve installed between the expander and the circulation pump and configured to switch a collection direction flow of the working fluid, and a collection line configured to guide a transfer of the working fluid from the directional control valve to the storage tank, includes: a primary collection step of collecting the working fluid into the storage tank by pressure of the boiler; and a secondary collection step of collecting the working fluid into the storage tank by a forcible pumping action after the pressure of the boiler is decreased to a set level.

The directional control valve may include an inlet port connected to the storage tank, an outlet port connected to the boiler, and first and second collection ports that are opened and closed so that the working fluid flows from an evaporator toward the storage tank, the collection line may include a first collection line connected to the first collection port and a second collection line connected to the second collection port, and in the primary collection step, the outlet port and the first collection port of the directional control valve may be in communication with each other, such that the working fluid is collected into the storage tank through the first collection line.

A collection pump may be installed on the second collection line, and in the secondary collection step, when the pressure of the boiler is decreased to an allowable pressure or less of the collection pump after the primary collection step is performed, the outlet port and the second collection port of the directional control valve may be in communication with each other, such that the working fluid is collected into the storage tank through the second collection line.

The working fluid collecting method for a Rankine cycle waste heat recovery system may further include, before the primary collection step, a step of sensing an occurrence of a problematic situation or a stop of an operation of the Rankine cycle waste heat recovery system.

When a change in a water level in the storage tank is a set value or less after the secondary collection step, an inlet port and an outlet port of the directional control valve may be in communication with each other.

When a change in a water level in the storage tank is a set value or more after the secondary collection step, a warning that the working fluid has leaked may be executed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, sizes of components, thicknesses of lines, and the like, illustrated in the accompanying drawings referred to in describing the present disclosure may be exaggerated for convenience of the understanding. In addition, since terms used in a description of the present disclosure are defined in consideration of functions of the present disclosure, they may be changed depending on users, the intentions of operators, customs, and the like. Therefore, these terms should be defined based on entire contents of the present disclosure.

Figure 1:
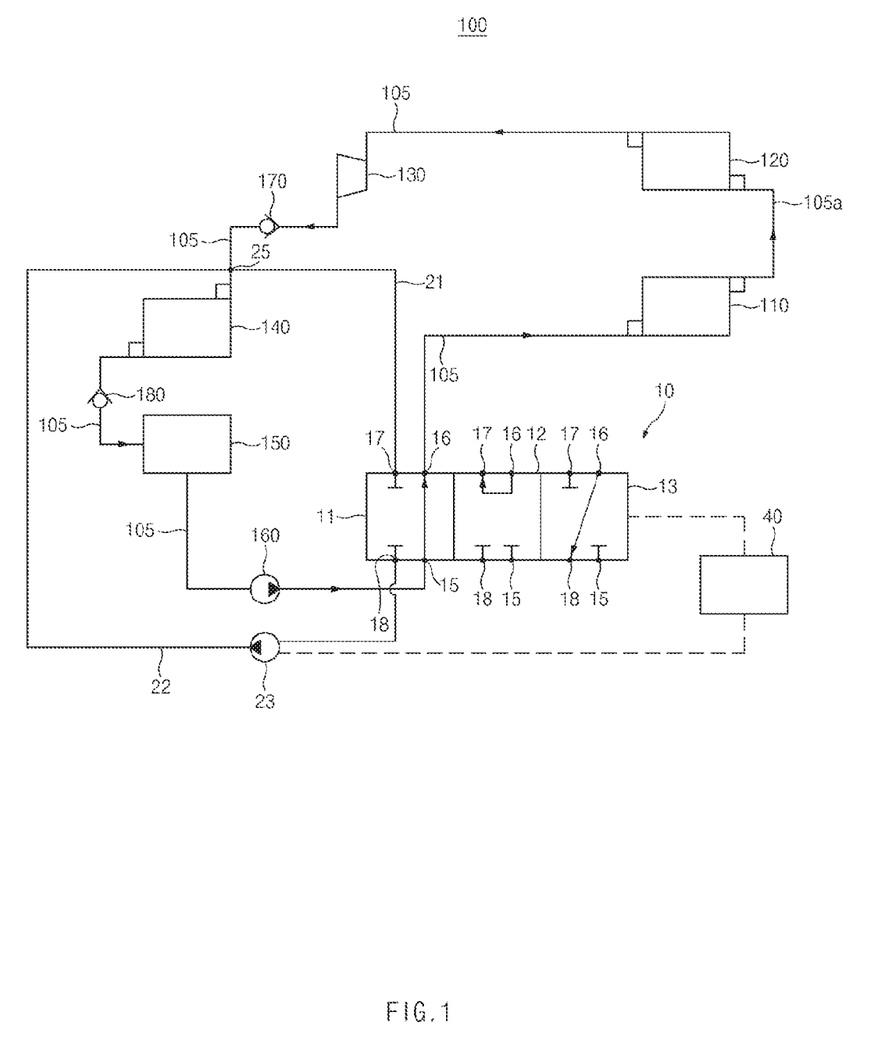
FIG. 1, which is a view illustrating a working fluid collecting apparatus for a Rankine cycle waste heat recovery system according to an exemplary embodiment of the present disclosure, illustrates a flow of a working fluid at a time of a normal waste heat recovery operation.
Figure 2:
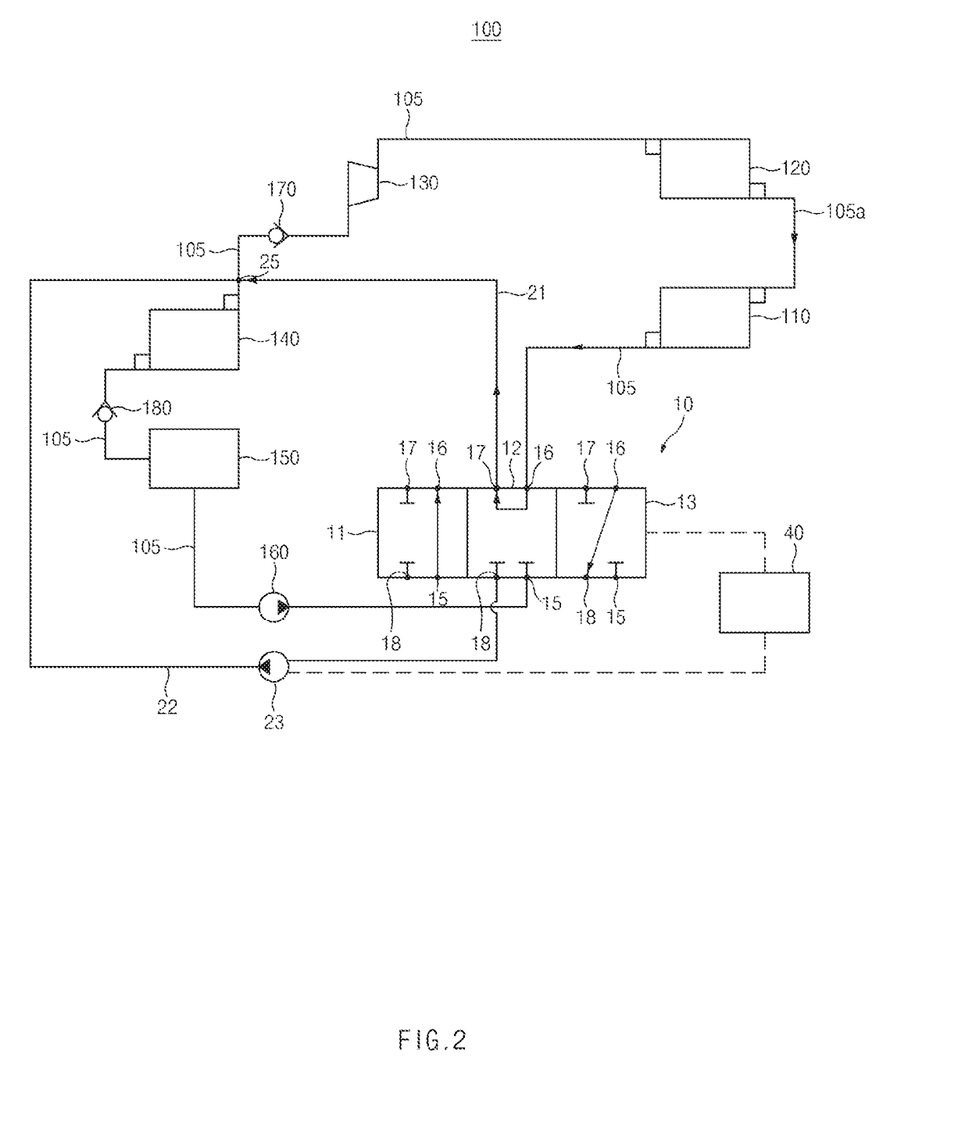
FIG. 2 is a view illustrating a collection flow of a working fluid at a time of a primary collection operation in a working fluid collecting apparatus for a Rankine cycle waste heat recovery system according to an exemplary embodiment of the present disclosure.
Figure 3:
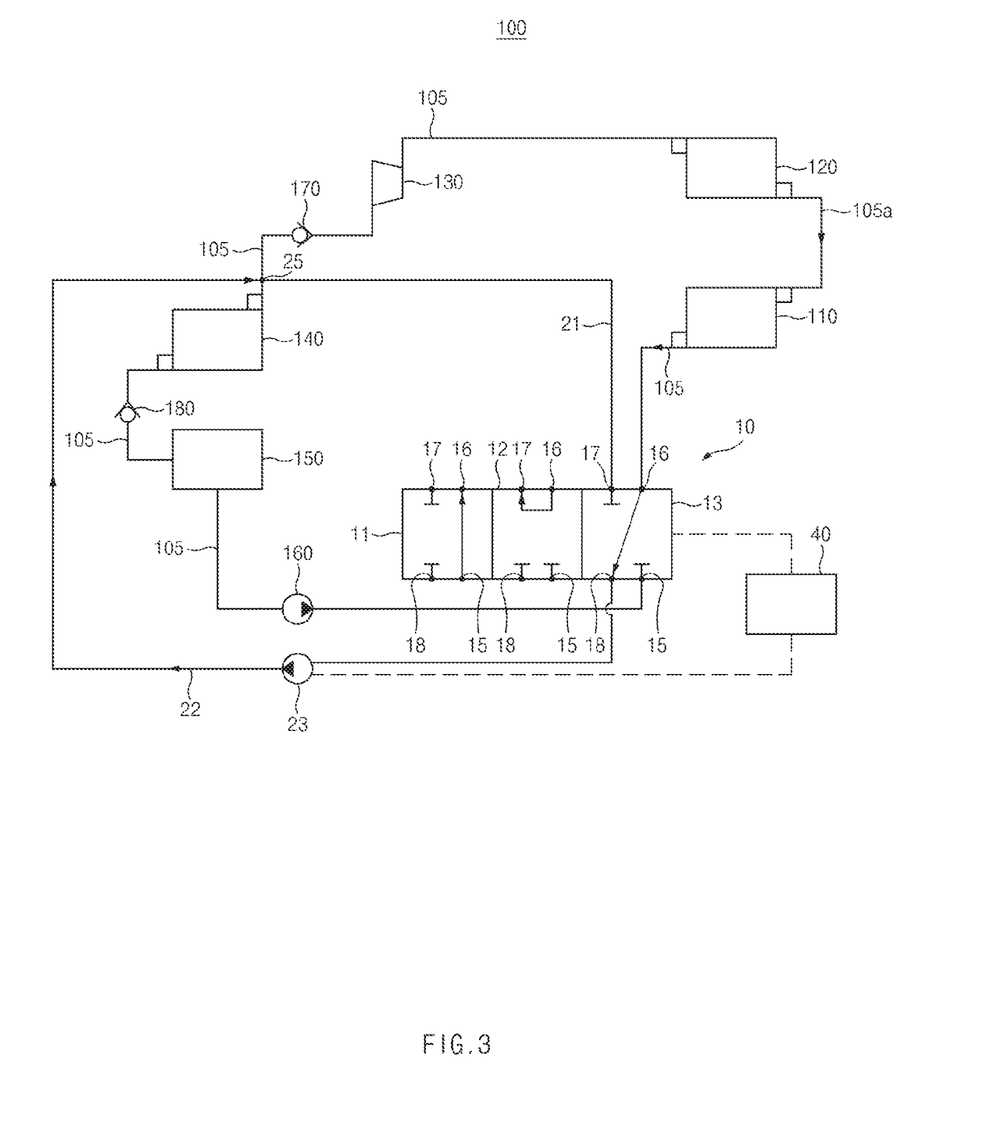
FIG. 3 is a view illustrating a collection flow of a working fluid at a time of a secondary collection operation in a working fluid collecting apparatus for a Rankine cycle waste heat recovery system according to an exemplary embodiment of the present disclosure.

Referring to FIGS. 1 to 3, a Rankine cycle waste heat recovery system may include a Rankine cycle 100 for recovering waste heat discharged from an engine as energy.

The Rankine cycle 100 may include a circulation path 105 through which a working fluid is circulated, and boilers (evaporators) 110 and 120, an expander 130, a condenser 140, a storage tank 150, and a pump 160 may be installed in the circulation path 105.

One or more boilers 110 and 120 may be configured to heat and evaporate the working fluid by the waste heat (heat of an exhaust gas and/or heat of an exhaust gas recirculation (EGR) gas) of the engine to generate an evaporated working fluid. For example, the boilers 110 and 120 may include an exhaust gas boiler 110 arranged in an exhaust pipe of the engine, an EGR gas boiler 120 arranged in an EGR path of the engine, and the like.

The expander 130 may be configured to expand the working fluid supplied from the evaporators 110 and 120 to generate rotational power.

The condenser 140 may be configured to condense the working fluid discharged from the expander 130 to generate a liquid-phase working fluid.

The circulation pump 160 may be configured to supply the working fluid from the condenser 130 to the evaporator 110.

A working fluid collecting apparatus according to the present disclosure may include the storage tank 150 installed between the condenser 140 and the circulation pump 160, a directional control valve 10 controlling a flow direction of the working fluid, and collection lines 21 and 22 for guiding the working fluid into the storage tank 150 by a control of the directional control valve 10.

The storage tank 150 may be installed in the circulation path 105. The storage tank 150 may be located downstream of the condenser 140. In such a case, the working fluid may be cooled to a temperature appropriate for being stored by the condenser 140 and then stored in the storage tank 150, such that the working fluid may be very easily stored, and damage to the storage tank 150 due to high heat, or the like, may be prevented.

In addition, the circulation pump 160 may be located downstream of the storage tank 150, such that the storage tank 150 may be installed between the condenser 140 and the circulation pump 160 to temporally store the working fluid therein or smoothly circulate the working fluid.

The directional control valve 10 may include an inlet port 15, an outlet port 16, and one or more collection ports 17 and 18.

The inlet port 15 may be configured to be connected to an outlet of the circulation pump 160 to directly receive the working fluid discharged by the circulation pump 160.

Therefore, the working fluid transferred through the storage tank 150 and the circulation pump 160 may be introduced into the inlet port 15.

The outlet port 16 may be configured to be connected to the boilers 110 and 120 to discharge the working fluid to the boilers 110 and 120.

The collection ports 17 and 18 may be configured to be connected to the storage tank 150 to discharge the working fluid to the storage tank 150.

The directional control value 10 may include a valve member (not illustrated) such as a spool, or the like, channels (not illustrated) that are in communication with the ports 15 to 18 described above, and an actuator (not illustrated) actuating the valve member (not illustrated). Therefore, the valve member may be actuated to selectively open and close the inlet port 15, the outlet port 16, and the collection ports 17 and 18 and vary the channels.

Meanwhile, an example in which the directional control valve 10 may be formed of a three-position valve having a first position 11, a second position 12, and a third position 13 has been illustrated by way of example FIGS. 1 to 3.

Particularly, the directional control valve 10 may have the first position 11 (see FIG. 1) at which the inlet port 15 and the outlet port 16 are in communication with each other, the second position 12 (see FIG. 2) at which the outlet port 16 and a first collection port 17 are in communication with each other, and the third position 13 (see FIG. 3) at which the outlet port 16 and a second collection port 18 are in communication with each other.

In the first position 11 of the directional control valve 10, as illustrated in FIG. 1, when the first and second collection ports 17 and 18 are closed and the inlet port 15 and the outlet port 16 are opened, an internal channel may be formed so that the inlet port 15 and the outlet port 16 are in communication with each other.

In the second position 12 of the directional control valve 10, as illustrated in FIG. 2, when the inlet port 15 and the second collection port 18 are closed and the outlet port 16 and the first collection port 17 are opened, an internal channel may be formed so that the outlet port 16 and the first collection port 17 are in communication with each other.

In the third position 13 of the directional control valve 10, as illustrated in FIG. 3, when the inlet port 15 and the first collection port 17 are closed and the outlet port 16 and the second collection port 18 are opened, an internal channel may be formed so that the outlet port 16 and the second collection port 18 are in communication with each other.

The collection lines 21 and 22 may be configured to introduce the working fluid remaining in the circulation path 105 and the working fluid in the boilers 110 and 120 into the storage tank 150.

Particularly, the collection lines 21 and 22 may include a first collection line 21 connected to the first collection port 17 of the directional control valve 10 and a second collection line 22 connected to the second collection port 18 of the directional control valve 10.

One end of the first collection line 21 may be connected to the first collection port 17 of the directional control valve 10, and the other end of the first collection line 21 may be connected at an upstream point of the storage tank 150 on the circulation path 105.

One end of the second collection line 22 may be connected to the second collection port 18 of the directional control valve 10, and the other end of the second collection line 22 may be connected at an upstream point of the storage tank 150 on the circulation path 105. In addition, a collection pump 23 configured to transfer the working fluid by a forcible pumping action toward the storage tank 150 may be arranged in the second collection line 22.

As illustrated in FIGS. 1 to 3, the other end of the first collection line 21 and the other end of the second collection line 22 may be configured to be connected at the junction 25 located at an upstream point of the condenser 140.

Particularly, the junction 25 may be positioned between the expander 130 and the condenser 140. Therefore, the working fluid transferred by the first and second collection lines 21 and 22 may be collected into the storage tank 150 through the condenser 140. Therefore, in the case of collecting the working fluid remaining in the circulation path 105 in a state in which an operation of the Rankine cycle waste heat recovery system is stopped or collecting the working fluid from the boilers 110 and 120 at the time of occurrence of a problematic situation, since the working fluid may be cooled to a temperature appropriate for being stored by the condenser 140 and be then stored in the storage tank 150, the working fluid may be very easily stored, and damage to the storage tank 150, or the like, due to a high heat of the working fluid may be prevented.

In addition, a backward flow preventing valve 180 may be installed between the condenser 140 and the storage tank 150. The backward flow preventing valve 180 may be configured to prevent the working fluid from flowing backward from the storage tank 150 to the condenser 140.

Meanwhile, the condenser 140, the storage tank 150, the collection pump 23, the directional control valve 10, and the like, may be sequentially stacked in a vertical direction so as to facilitate recovery of the working fluid. Particularly, the storage tank 150 may be positioned below the condenser 140, and the collection pump 23 and the directional control valve 10 may be positioned below the storage tank 150. Therefore, the working fluid may be smoothly transferred from the condenser 140 to the storage tank 150 by gravity, such that recovery efficiency may be improved.

In addition, a backward flow preventing valve 170 for preventing the collected working fluid from flowing backward from the condenser 140 to the expander 130 may also be installed between the expander 130 and the condenser 140.

According to an exemplary embodiment, the backward flow preventing valve 170 may be formed of a check valve.

According to an alternative exemplary embodiment, the backward flow preventing valve 170 may also be formed of an on/off valve that may simply block and open a channel. The reason why the backward flow preventing valve 170 may be formed of the on/off valve is that a large flow resistance may be generated in the case in which the backward flow preventing valve 170 is formed of the check valve.

In addition, a controller 40 for controlling operations of the directional control valve 10 and the collection pump 23 may be provided. The controller 40 may be connected to an electronic control unit (ECU) of a vehicle, sensors of the boilers 110 and 120, a sensor of the expander 130, a leakage sensing sensor for sensing leakage of the working fluid, a collection switch for generating a collection signal of the working fluid, and the like. Therefore, the controller 40 may receive various information on the vehicle, information on leakage of the working fluid (detected by an air leakage sensor, or the like), information on pressure of the boilers 110 and 120, information on a revolution per minute (RPM) of the expander 130, the collection signal of the working fluid, and the like, and may control operations of the directional control valve 10 and the collection pump 23 on the basis of the information received as described above.

In the working fluid collecting apparatus according to the present disclosure configured as described above, the first collection port 17 and the second collection port 18 may be sequentially opened through a control of the directional control valve 10, such that the working fluid may be stepwise collected into the storage tank in two steps through the first collection line 21 and the second collection line 22. The reason is that since initial pressure in the boilers 110 and 120 is in a high pressure state in which it exceeds allowable pressure that the collection pump 23 may endure, in the case in which the working fluid in a high pressure state is directly collected from the boilers 110 and 120 by the collection pump 23, the collection pump 23 may be easily damaged due to the working fluid in the high pressure state.

Therefore, in the present disclosure, a primary collection operation of collecting the working fluid through the first collection port 17 and the first collection line 21 by initial high pressure of the boilers 110 and 120 may be performed, and a secondary collection operation of forcibly collecting the working fluid through the second collection port 18 and the second collection line 22 may be performed when pressure in the boilers 110 and 120 is decreased to the allowable pressure or less of the collection pump 23 after the primary collection operation.

The two-step collection process described above will be described in more detail below.

First, in the case in which the Rankine cycle waste heat recovery system is normally operated as illustrated in FIG. 1, the directional control valve 10 may be switched into the first position 11. Therefore, the first and second collection ports 17 and 18 may be closed and the inlet port 15 and the outlet port 16 may be opened, such that the inlet port 15 and the outlet port 16 are in communication with each other.

Therefore, the working fluid may sequentially pass and may be circulated through the boilers 110 and 120, the expander 130, the condenser 140, the storage tank 150, and the like, by the circulation pump 160 on the circulation path 105 of the Rankine cycle 100, such that a normal waste heat recovery operation is performed.

In addition, in the case in which the working fluid remaining in the circulation path 105, the working fluid remaining in the boilers 110 and 120, or the like, is intended to be collected into the storage tank 150 at the time of occurrence of the problematic situation or after the operation of the Rankine cycle waste heat recovery system is stopped, the directional control valve 10 may be switched into the second position 12, as illustrated in FIG. 2. Therefore, the inlet port 15 and the second collection port 18 may be closed and the outlet port 16 and the first collection port 17 may be opened, such that the outlet port 16 and the first collection port 17 may be in communication with each other. In this state, the working fluid remaining in the boilers 110 and 120 or the circulation path 105 may be transferred to the condenser 140 through the first collection port 17 and the first collection line 21 by the high pressure in the boilers 110 and 120 and may then be collected from the condenser 140 into the storage tank 150 by gravity (primary collection operation).

Then, in the case in which the pressure in the boilers 110 and 120 is decreased to the allowable pressure or less of the collection pump 23, the directional control valve 10 may be switched into the third position 13, as illustrated in FIG. 3. Therefore, the inlet port 15 and the first collection port 17 may be closed and the outlet port 16 and the second collection port 18 may be opened, such that the outlet port 16 and the second collection port 18 are in communication with each other. In this state, the working fluid remaining in the boilers 110 and the 120 or the circulation path 105 may be transferred to the condenser 140 through the second collection port 18 and the second collection line 22 by the forcible pumping action of the collection pump 23 and may then be collected from the condenser 140 into the storage tank 150 by gravity (secondary collection operation).

Examples in which the exhaust gas boiler 110 and the EGR gas boiler 120 may be connected to each other in series through a series pipe 105a with respect to the circulation path 105 between the expander 130 and the circulation pump 160 have been illustrated in FIGS. 1 to 3.

Figure 4:
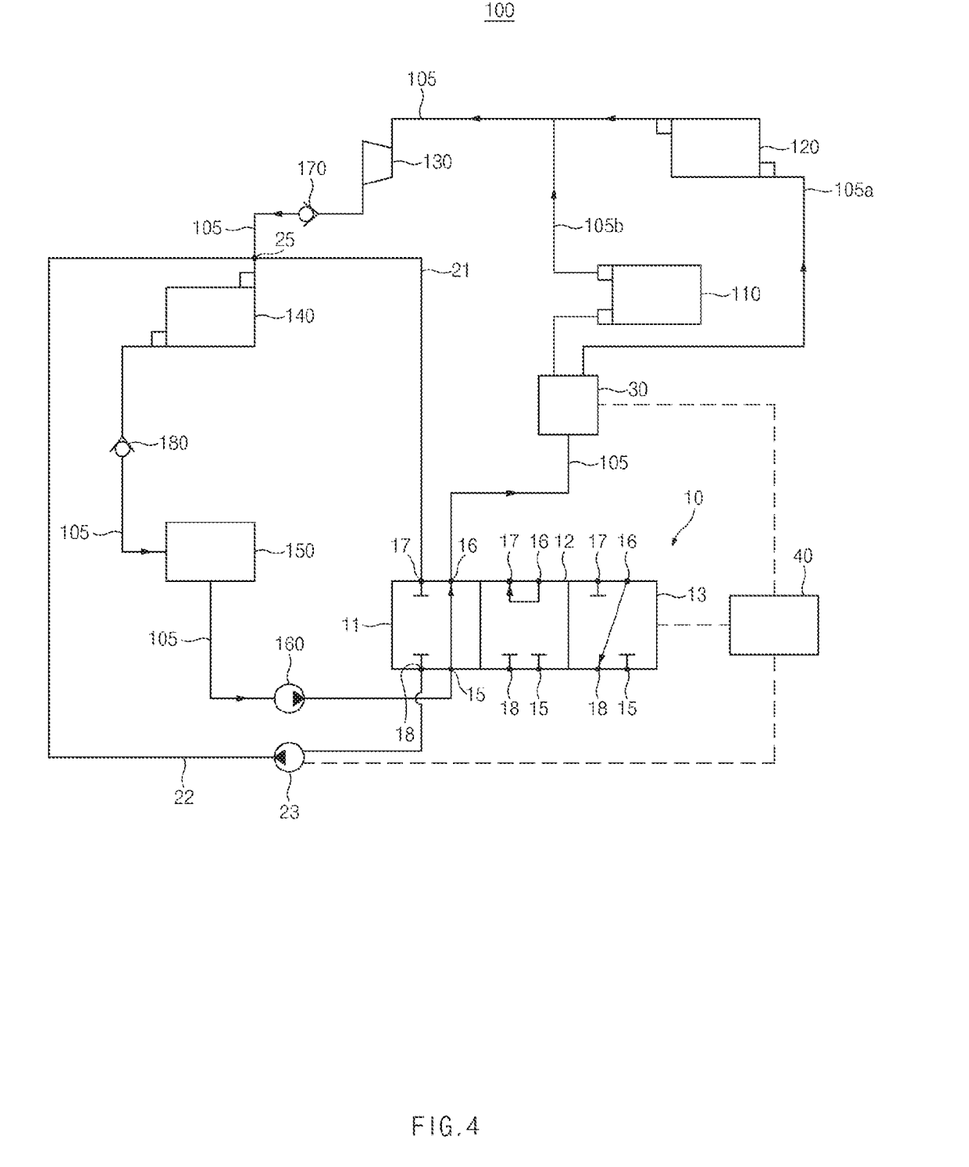
FIG. 4, which is a view illustrating a working fluid collecting apparatus for a Rankine cycle waste heat recovery system according to another exemplary embodiment of the present disclosure, illustrates a flow of a working fluid at a time of a normal waste heat recovery operation.
Figure 5:
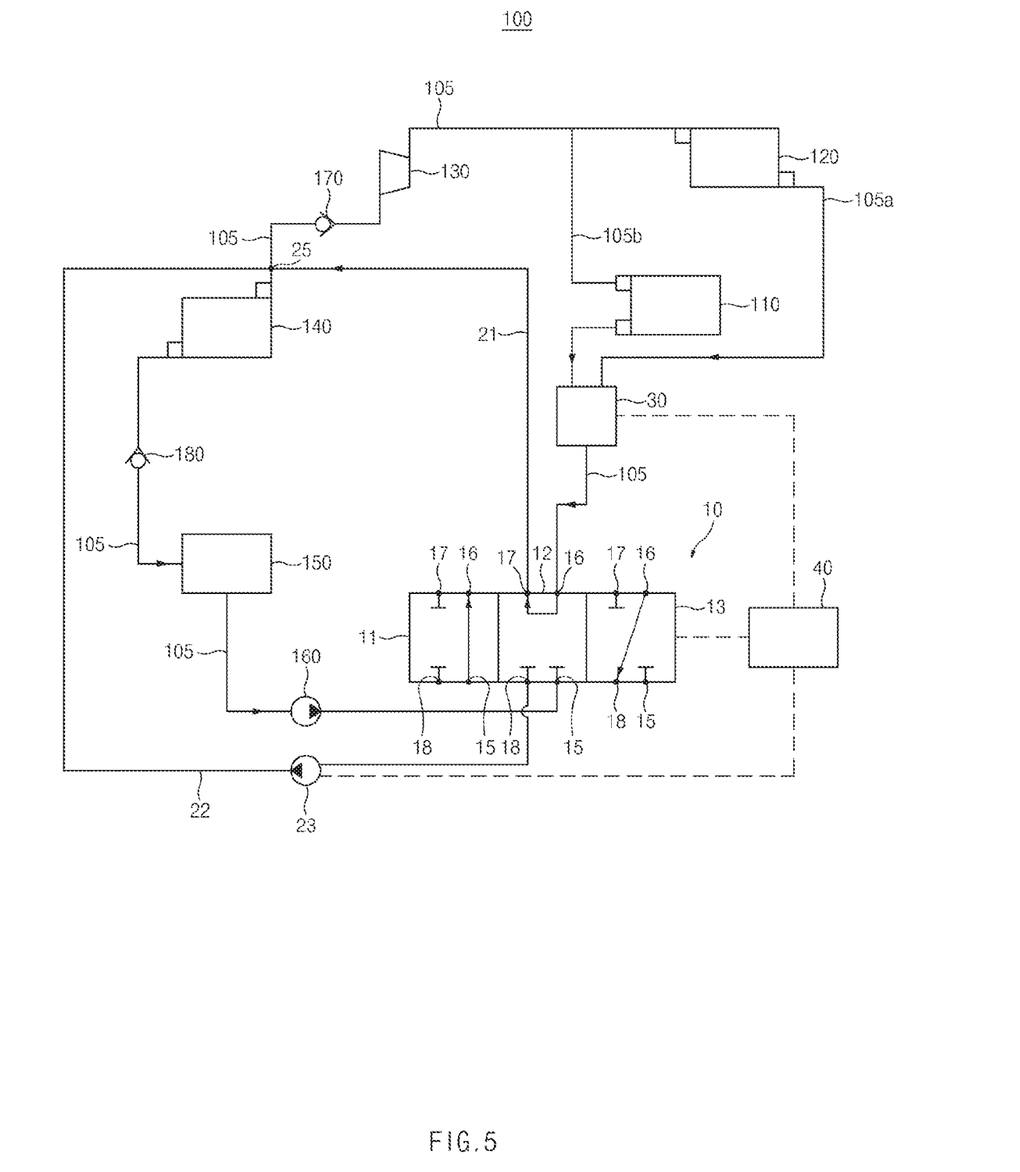
FIG. 5 is a view illustrating a collection flow of a working fluid at a time of a primary collection operation in a working fluid collecting apparatus for a Rankine cycle waste heat recovery system according to another exemplary embodiment of the present disclosure.
Figure 6:
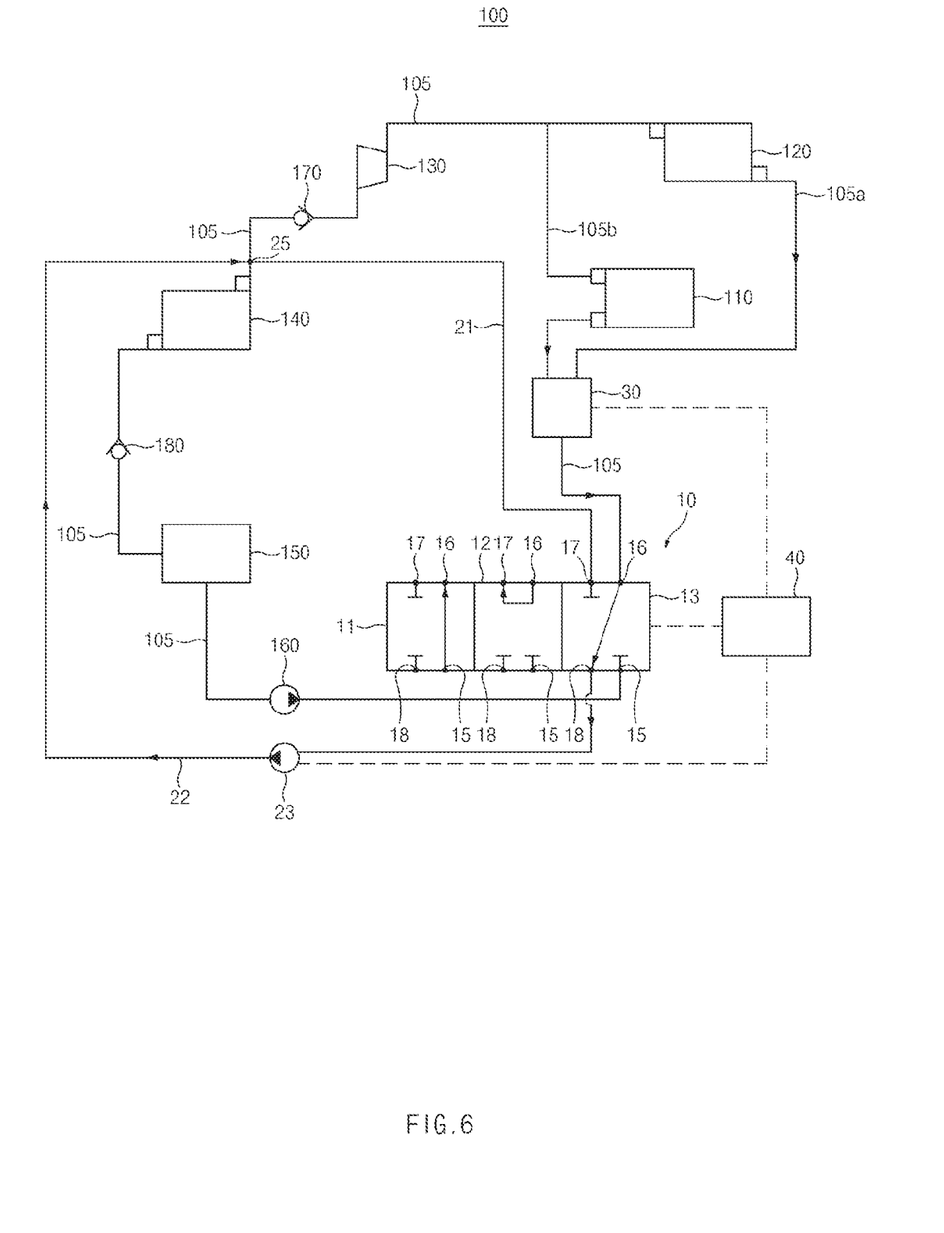
FIG. 6 is a view illustrating a collection flow of a working fluid at a time of a secondary collection operation in a working fluid collecting apparatus for a Rankine cycle waste heat recovery system according to another exemplary embodiment of the present disclosure.

FIGS. 4 to 6 are views illustrating a working fluid collecting apparatus for a Rankine cycle waste heat recovery system according to another exemplary embodiment of the present disclosure.

An example in which the exhaust gas boiler 110 and the EGR gas boiler 120 may be connected to each other in parallel through parallel pipes 105b and 105c with respect to the circulation path 105 between the expander 130 and the circulation pump 160 has been illustrated in FIGS. 4 to 6.

In addition, a channel switching valve 30 may be connected to the directional control valve 10. The channel switching valve 30 may be configured to switch a channel so that the working fluid flows toward at least one of the exhaust gas boiler 110 and the EGR gas boiler 120.

The controller 40 may be electrically connected to the directional control valve 10, the collection pump 23, and the channel switching valve 30 to control operations of the directional control valve 10, the collection pump 23, and the channel switching valve 30.

Since configurations and operations other than the above-mentioned configuration and operation are similar to those of the exemplary embodiment described above, a detailed description therefor will be omitted.

Figure 7:
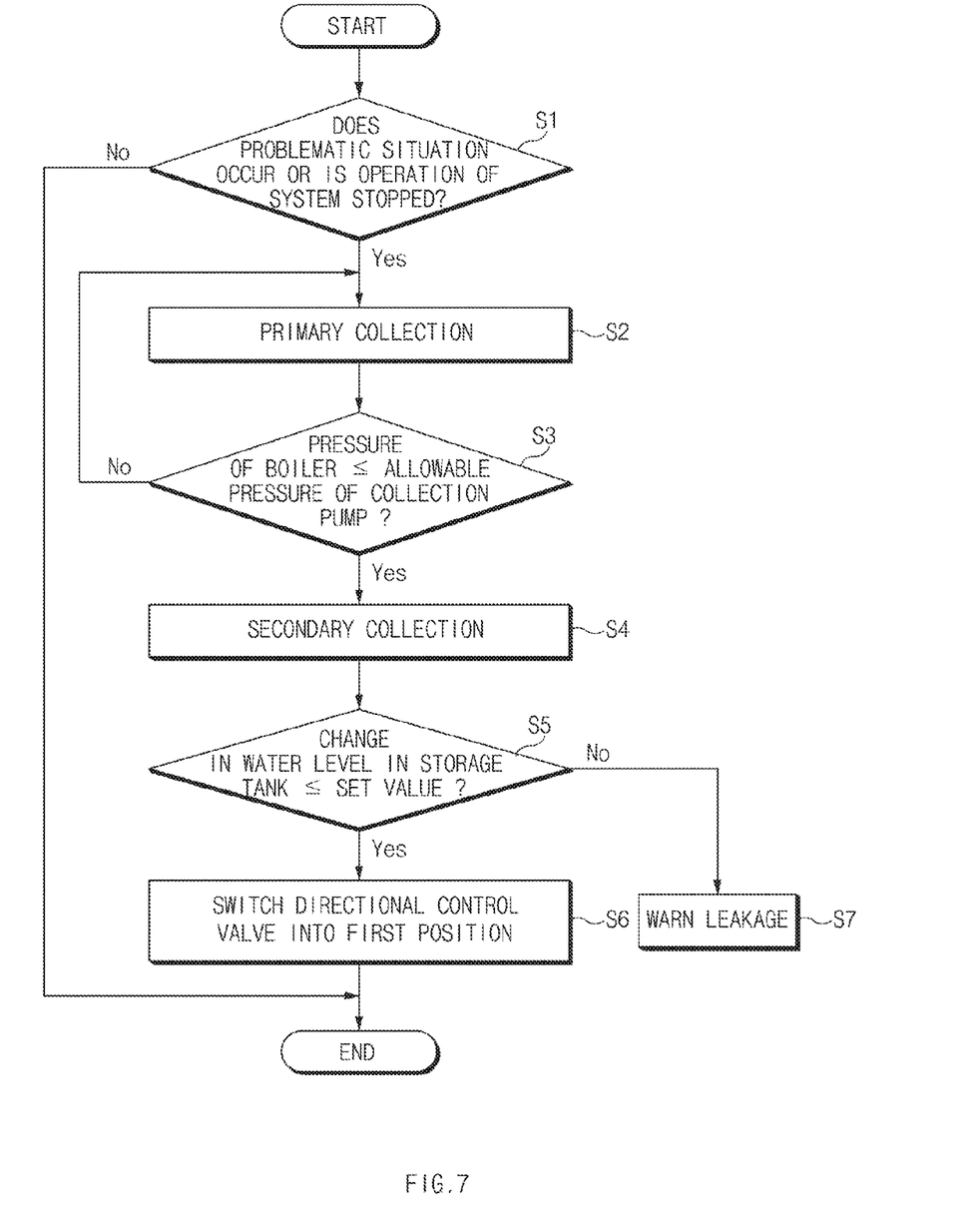
FIG. 7 is a flow chart illustrating a working fluid collecting method for a Rankine cycle waste heat recovery system according to the present disclosure.

FIG. 7 is a flow chart illustrating a working fluid collecting method of collecting the working fluid into the storage tank using the working fluid collecting apparatus for a Rankine cycle waste heat recovery system described above.

First, an occurrence of a problematic situation, a stop of an operation of the Rankine cycle waste heat recovery system, or the like, is detected (S1). Examples of the occurrence of the problematic situation may include a case in which leakage of the working fluid is sensed by a leakage sensing sensor, a case in which a passenger senses the leakage of the working fluid, or the like, to turn on a collection switch, a case in which external impact is severely sensed through a sensor, or the like, of an air bag, and the like.

When the problematic situation occurs or the operation of the Rankine cycle waste heat recovery system is stopped as described above, primary collection may be performed (S2).

In the primary collection step (S2) described above, the directional control valve 10 may be switched into the second position 12, as described above. Therefore, the outlet port 16 and the first collection port 17 of the directional control valve 10 may be in communication with each other, such that the working fluid may be collected into the storage tank 150 through the first collection line 21 by the pressure (high pressure) of the boilers 110 and 120.

After the primary collection step is performed, it may be decided whether or not the pressure of the boilers 110 and 120 is decreased to the allowable pressure or less of the collection pump 23 (S3), and secondary collection may be performed (S4) when the pressure of the boilers 110 and 120 is decreased to the allowable pressure or less of the collection pump 23.

In the secondary collection step (S4) described above, the directional control valve 10 may be switched into the third position 13, as described above. Therefore, the outlet port 16 and the second collection port 18 of the directional control valve 10 may be in communication with each other, such that the working fluid may be collected into the storage tank 150 through the second collection line 22 by the forcible pumping action of the collection pump 23.

When a change in a water level in the storage tank 150 is equal to or smaller than a set value for deciding whether or not the working fluid has leaked after the secondary collection step (S4) described above, the directional control valve 10 may be switched into the first position 11. Therefore, the first and second collection ports 17 and 18 may be closed and the inlet port 15 and the outlet port 16 may be opened, such that the inlet port 15 and the outlet port 16 are in communication with each other. Therefore, the working fluid may sequentially pass through and may be circulated through the boilers 110 and 120, the expander 130, the condenser 140, the storage tank 150, and the like, by the circulation pump 160 on the circulation path 105 of the Rankine cycle 100, such that the normal waste heat recovery operation is performed (S6).

In addition, when the change in the water level in the storage tank 150 is equal to or larger than the set value for deciding whether or not the working fluid is leaked after the secondary collection step described above, a warning that the working fluid has leaked may be executed through a visual or auditory means, or the like (S7).

As described above, according to embodiments of the present disclosure, the working fluid circulated in the Rankine cycle may be collected into the storage tank at the time of occurrence of an emergency situation or the stop of the operation of the Rankine cycle waste heat recovery system, thereby making it possible to prevent the working fluid of the Rankine cycle from being leaked, effectively monitor whether or not the working fluid is leaked, and effectively prevent freezing, or the like, of the working fluid due to remaining of the working fluid.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A working fluid collecting apparatus for a Rankine cycle waste heat recovery system, comprising:
    a storage tank for storing a working fluid circulated in a Rankine cycle therein; and
    a collection means for collecting the working fluid into the storage tank,
    wherein the collection means includes:
    a directional control valve for controlling a flow direction of the working fluid in the Rankine cycle; and
    a collection line for introducing the working fluid into the storage tank by a control of the directional control valve,
    wherein the directional control valve includes a first collection port and a second collection port, and the collection line includes a first collection line connected to the first collection port and a second collection line connected to the second collection port, and
    wherein the first collection port and the second collection port are sequentially opened, such that the working fluid is stepwise collected into the storage tank through the first collection line and the second collection line.

2. A working fluid collecting apparatus for a Rankine cycle waste heat recovery system including a circulation path through which a working fluid is circulated, and a boiler for heating and evaporating the working fluid by waste heat of an engine, an expander for expanding the working fluid supplied from the boiler to generate rotational power, a condenser for condensing the working fluid discharged from the expander, and a circulation pump for circulating the working fluid on the circulation path, comprising:
- a storage tank installed between the condenser and the circulation pump for storing the working fluid therein;
- a directional control valve installed between the circulation pump and the boiler, for controlling a flow direction of the working fluid, and having one or more collection ports allowing the working fluid to flow to the storage tank; and
- one or more collection lines connected from the one or more collection ports of the directional control valve to the storage tank,
- wherein the directional control valve includes an inlet port connected to the storage tank, an outlet port connected to the boiler, and first and second collection ports that are opened and closed so that the working fluid flows from an evaporator toward the storage tank.

3. The working fluid collecting apparatus for a Rankine cycle waste heat recovery system according to claim 2, wherein the collection lines include a first collection line connected from the first collection port to the storage tank and a second collection line connected from the second collection port to the storage tank.

4. The working fluid collecting apparatus for a Rankine cycle waste heat recovery system according to claim 3, wherein a collection pump forcibly transferring the working fluid toward the storage tank is arranged in the second collection line.

5. The working fluid collecting apparatus for a Rankine cycle waste heat recovery system according to claim 3, wherein the first collection line and the second collection line are connected at a point upstream of the storage tank on the circulation path.

6. The working fluid collecting apparatus for a Rankine cycle waste heat recovery system according to claim 5, wherein a junction in which the first collection line and the second collection line are connected is positioned between the expander and the condenser.

7. The working fluid collecting apparatus for a Rankine cycle waste heat recovery system according to claim 6, wherein a backward flow preventing valve preventing the working fluid from flowing backward from the condenser to the expander is installed between the expander and the condenser.

8. The working fluid collecting apparatus for a Rankine cycle waste heat recovery system according to claim 2, wherein the directional control valve has a first position at which the inlet port and the outlet port are in communication with each other, a second position at which the outlet port and the first collection port are in communication with each other, and a third position at which the outlet port and the second collection port are in communication with each other.

9. The working fluid collecting apparatus for a Rankine cycle waste heat recovery system according to claim 2, wherein the storage tank is positioned below the condenser.

10. The working fluid collecting apparatus for a Rankine cycle waste heat recovery system according to claim 2, wherein the directional control valve is positioned below the storage tank.

11. The working fluid collecting apparatus for a Rankine cycle waste heat recovery system according to claim 2, wherein the boiler includes an exhaust gas boiler arranged in an exhaust pipe of the engine and an exhaust gas recirculation (EGR) gas boiler arranged in an EGR path of the engine.

12. The working fluid collecting apparatus for a Rankine cycle waste heat recovery system according to claim 11, wherein the exhaust gas boiler and the EGR gas boiler are connected to each other in series with respect to the circulation path.

13. The working fluid collecting apparatus for a Rankine cycle waste heat recovery system according to claim 11, wherein the exhaust gas boiler and the EGR gas boiler are connected to each other in parallel with respect to the circulation path.

14. The working fluid collecting apparatus for a Rankine cycle waste heat recovery system according to claim 13, further comprising a channel switching valve for switching a channel so that the working fluid flows toward at least one of the exhaust gas boiler and the EGR gas.

15. A working fluid collecting method for a Rankine cycle waste heat recovery system using a working fluid collecting apparatus for a Rankine cycle waste heat recovery system including a storage tank for storing a working fluid circulated through a circulation path in which a boiler, an expander, a condenser, and a circulation pump are installed therein, a directional control valve installed between the expander and the circulation pump for switching a collection direction flow of the working fluid, and a collection line for guiding a transfer of the working fluid from the directional control valve to the storage tank, comprising:
- a primary collection step of collecting the working fluid into the storage tank by pressure of the boiler; and
- a secondary collection step of collecting the working fluid into the storage tank by a forcible pumping action after the pressure of the boiler is decreased to a set level,
- wherein the directional control valve includes an inlet port connected to the storage tank, an outlet port connected to the boiler, and first and second collection ports that are opened and closed so that the working fluid flows from the evaporator toward the storage tank,
- the collection line includes a first collection line connected to the first collection port and a second collection line connected to the second collection port, and
- in the primary collection step, the outlet port and the first collection port of the directional control valve are in communication with each other, such that the working fluid is collected into the storage tank through the first collection line.

16. The working fluid collecting method for a Rankine cycle waste heat recovery system according to claim 15, wherein a collection pump is installed on the second collection line, and
- in the secondary collection step, when the pressure of the boiler is decreased to an allowable pressure or less of the collection pump after the primary collection step is performed, the outlet port and the second collection port of the directional control valve are in communication with each other, such that the working fluid is collected into the storage tank through the second collection line.

17. The working fluid collecting method for a Rankine cycle waste heat recovery system according to claim 15, further comprising, before the primary collection step, a step of sensing an occurrence of a problematic situation or a stopping of an operation of the Rankine cycle waste heat recovery system.

18. The working fluid collecting method for a Rankine cycle waste heat recovery system according to claim 15, wherein when a change in a water level in the storage tank is a set value or less after the secondary collection step, an inlet port and an outlet port of the directional control valve are in communication with each other.

19. The working fluid collecting method for a Rankine cycle waste heat recovery system according to claim 15, wherein when a change in a water level in the storage tank is a set value or more after the secondary collection step, a warning that the working fluid has leaked is executed.

* * * * *